Patented Oct. 26, 1948

2,452,386

UNITED STATES PATENT OFFICE 2,452,386

ETHERS OF VITAMIN A

Nicholas A. Milas, Belmont, Mass., assignor to Research Corporation, New York, N. Y., a corporation of New York No Drawing. Original application February 8, 1940, Serial No. 317,967. Divided and this application April 1, 1946, Serial No. 658,889

3 Claims. (Cl. 260—611)

The present invention relates to the alkyl ethers of vitamin A. Alkyl ethers of vitamin A have been prepared and found to be physiologically active. They are novel and are essential intermediates in certain methods for the synthesis of the vitamin. The ethers are prepared, in accordance with the present invention, by reacting the metallic vitaminates with alkyl halides or sulfates whereby the metal of the vitaminate is replaced by the alkyl group of the alkyl halide or sulfate yielding the corresponding alkyl ether of the vitamin.

The metal vitaminates readily are prepared by various methods, several of which are described in my Patent No. 2,296,291. A single method will be described hereinafter by way of illustration.

The reaction by which the ethers of the vitamins are formed from the vitaminates is illustrated by the following general reaction equations 1 and 2.

1. 

in which R represents the hydrocarbon portion of the molecule of vitamin A, Me represents a metal, R' represents an alkyl group and hal stands for a halogen.

2. 

in which R is the hydrocarbon portion of the molecule of vitamin A, Me stands for a metal and R' and R'' are the same or different alkyl groups.

The invention is illustrated by the following specific examples.

*Example 1.—The trityl ether of vitamin A*

To about 0.5 g. of vitamin A in 10 cc. of t-butyl alcohol was added about 0.1 g. of metallic potassium in 25 cc. of t-butyl alcohol. The mixture became dark red with a slight turbidity indicating the formation of potassium vitaminate. To this mixture was added 0.5 g. of pure trityl chloride and allowed to stand at 30–40° for 2 hours whereby it became lighter in color with considerable solid separating out. The solvents were then removed under reduced pressure and the brownish solid residue extracted several times with pure petroleum ether the extracts combined and the ether removed. The solid residue was recrystallized a number of times from methyl alcohol and found to have a M. P. of 138–142°. With antimony trichloride in pure chloroform this product gave a green-blue color which had an absorption spectrum showing four bands with maxima at 6200 A°, 5600 A°, 4900 A° and 4350 A° units the last band being due to the presence of the trityl group. From the extinction coefficient at 6200 A units, it was found to have a potency of 364,000 International vitamin A units per gram expressed as vitamin A.

*Example 2.—The methyl ether of vitamin A*

To 25 cc. of t-butyl alcohol containing 0.1 g. of metallic potassium was added about 1 g. of vitamin A in 50 cc. of anhydrous ether. An immediate change of color from light yellow to deep red occurred indicating the formation of the potassium vitaminate. The mixture was cooled to 0° and treated with slightly in excess of the calculated amount of dimethyl sulfate and allowed to stand at room temperature for one hour. To make sure that the reaction mixture was basic 0.1 g. of metallic potassium in 25 cc. of t-butyl alcohol was added. After the mixture was allowed to stand for some time at room temperature the solvents were removed under reduced pressure and the residue extracted a number of times with pure petroleum ether. Attempts to purify this product were not as successful as in the case of the trityl ether since it failed to crystallize. With antimony trichloride it gave a strong greenish-blue coloration the spectrum of which was not taken.

A preliminary biological assay of both the trityl and the methyl ethers of vitamin A gave positive results although the exact potency has not yet been determined.

From the foregoing examples it will be apparent that various alkyl ethers of vitamin A may be prepared by the substitution of the corresponding alkyl groups for the metal of the metal vitaminates. As stated the metal vitaminates may be prepared in a variety of ways.

This application is a division of my application, Serial No. 317,967 filed February 8, 1940, which is now Patent No. 2,410,893, dated November 12, 1946.

I claim:
1. As a new product the methyl ether of vitamin A.
2. As a new product the trityl ether of vitamin A.
3. As a new product a vitamin A ether of the group consisting of the lower alkyl ethers and the trityl ether.

NICHOLAS A. MILAS.

REFERENCES CITED

The following references are of record in the file of this patent:

UNITED STATES PATENTS

| Number | Name | Date |
|---|---|---|
| 2,410,893 | Milas | Nov. 12, 1946 |

OTHER REFERENCES

Kipping et al., "Chemistry and Industry," 1939, page 802.